B. BOYKIN, Jr.
TRAVELING BLOCK.
APPLICATION FILED DEC. 16, 1920.
1,424,075.
Patented July 25, 1922.
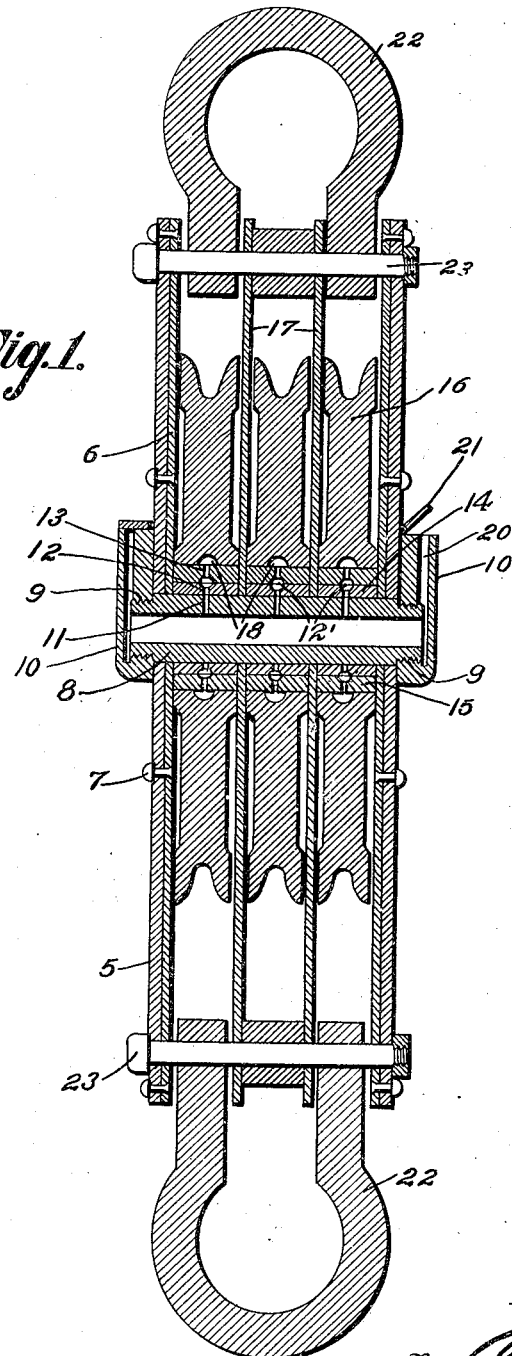
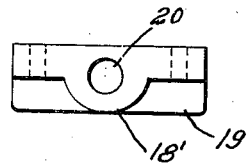
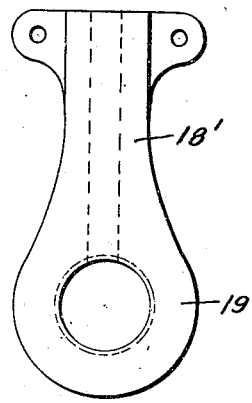
Inventor
B. Boykin, Jr.
By C. A. Snow & Co.
Attorneys

UNITED STATES PATENT OFFICE.

BURWELL BOYKIN, JR., OF BEAUMONT, TEXAS.

TRAVELING BLOCK.

1,424,075.  Specification of Letters Patent.  Patented July 25, 1922.

Application filed December 16, 1920. Serial No. 431,216.

*To all whom it may concern:*

Be it known that I, BURWELL BOYKIN, Jr., a citizen of the United States, residing at Beaumont, in the county of Jefferson and State of Texas, have invented a new and useful Traveling Block, of which the following is a specification.

This invention relates to a traveling block construction, it being the primary object of the invention to provide a block having a novel means for securing the elements thereof in assembled positions.

A further object of the invention is to provide a novel form of nut to be positioned on the ends of the supporting shaft of the block, the nuts being hollowed out to provide oil chambers for supplying the shaft with a lubricant.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a longitudinal sectional view through a block constructed in accordance with the present invention.

Figure 2 is a front elevational view of one of the securing caps or nuts; and

Figure 3 is a top plan view of the same.

Referring to the drawing in detail, the reference character 5 designates the side plates of the block, which are of any suitable design and to the side plates are secured the inner bearing plates 6, the bearing plates being held against movement as by means of the rivets 7.

A hollow shaft 8 is disposed substantially centrally of the side plates 5, and is provided with threaded extremities 9 which extend beyond the planes of the side walls of the plates 5, where the same accommodate the caps or nuts 10 which secure the shaft against movement.

This shaft 8 is preferably hollow and is provided with a plurality of openings 11 extending therethrough, which openings are in register with the openings 12 and 13 of the bearings 14 and 15 respectively, which have enlarged portions 12' forming pockets to accommodate quantities of oil, so that fluid may be directed from the hollow shaft through openings 12 and 13 to the bearing members 14 and 15 to lubricate the same. The bearing members 14 are secured to the shaft 8 in any suitable and well known manner, while the bearing members 15 are secured to the pulley, to move on the bearings 14.

Supported on the bearings are a plurality of pulleys 16 which are disposed in spaced relation by means of the plates 17, disposed between the bearing members and their pulleys, the pulleys being however provided with grooves 18 which register with the openings 12 and 13 to permit fluid to pass between the pulley and its bearing.

The caps, which are associated with the shaft 8, are of novel constructions, and include a relatively long body portion 18' and a lower portion 19, the lower portion being threaded to accommodate the threaded extensions formed on the ends of the shaft, the inner side walls of the caps contacting with the side plates 5 to support the same against movement.

The body portion of each cap is hollowed out as at 20 to provide an oil chamber to permit oil to be fed from the caps to the shaft 8, where the same may pass outwardly through the openings in the bearing members to lubricate the same.

In order that the caps may be protected against foreign matter entering the same, hinged covers 21 are provided, which hinged covers are supported at the upper ends of the caps and designed to move downwardly into engagement with the upper edges thereby to close the same.

It might be further stated however that suitable links indicated at 22 have connection with the side plates as by means of the bolts 23, which pass through the side plates and spacing plates 17.

Having thus described the invention, what is claimed as new is:—

In a device of the character described, side plates having openings, a hollow shaft extending through the openings, said shaft having threaded ends, cups having threaded openings positioned over the threaded ends and adapted to engage the side plates to secure the same in position, spacing plates supported on the shaft and disposed between the side plates, said shaft having openings extending through the wall thereof, bearing members having openings and mounted on the shaft, pulleys disposed between the spacing plates and mounted on the bearings, said pulleys having openings to receive a lubricant from the hollow shaft.

In testimony that I claim the foregoing as my own, I have hereto affixed my signature in the presence of two witnesses.

BURWELL BOYKIN, Jr.

Witnesses:
W. B. DRYSDALE,
F. J. BRAND.